US012604856B1

(12) United States Patent
Kath

(10) Patent No.: US 12,604,856 B1
(45) Date of Patent: Apr. 21, 2026

(54) ANIMAL CARRIER WITH ELECTROSTATIC DISCHARGE

(71) Applicant: Yap Designs, Inc., San Francisco, CA (US)

(72) Inventor: Liy Kath, San Francisco, CA (US)

(73) Assignee: Yap Designs, Inc., San Francisco, CA (US)

( * ) Notice: Subject to any disclaimer, the term of this patent is extended or adjusted under 35 U.S.C. 154(b) by 0 days.

(21) Appl. No.: 19/211,802

(22) Filed: May 19, 2025

(51) Int. Cl.
*A01K 1/02* (2006.01)

(52) U.S. Cl.
CPC ................................... *A01K 1/0254* (2013.01)

(58) Field of Classification Search
CPC .. A01K 1/0254; A01K 1/0236; A01K 1/0272; A01K 1/0281; A01K 1/029; A01K 1/0245
See application file for complete search history.

(56) References Cited

U.S. PATENT DOCUMENTS

| | | | | |
|---|---|---|---|---|
| 2,170,379 | A * | 8/1939 | Ortt | A01K 1/033 |
| | | | | 383/41 |
| 3,850,144 | A * | 11/1974 | Springer | A01K 1/0254 |
| | | | | 119/497 |
| 4,220,119 | A * | 9/1980 | Albright | A01K 1/0254 |
| | | | | D3/288 |
| 6,446,577 | B1 * | 9/2002 | Salahor | A01K 1/0254 |
| | | | | 119/470 |
| 7,210,426 | B2 * | 5/2007 | Yeung | A01K 1/0254 |
| | | | | 119/497 |
| 7,665,421 | B2 | 2/2010 | Martz | |
| 8,261,698 | B1 * | 9/2012 | McClain | A01K 1/0254 |
| | | | | 119/497 |
| 10,433,522 | B2 | 10/2019 | Renforth | |
| 10,772,288 | B1 | 9/2020 | Sandiford | |
| D914,995 | S * | 3/2021 | El-Fakir | D30/109 |
| D920,588 | S * | 5/2021 | Chen | D30/108 |
| D929,666 | S * | 8/2021 | He | D30/108 |
| 11,678,642 | B2 * | 6/2023 | Lin | A01K 1/0254 |
| | | | | 119/453 |
| 12,004,480 | B2 * | 6/2024 | Armstrong | A01K 1/0245 |
| 2003/0205601 | A1 * | 11/2003 | Kilduff | A45C 15/00 |
| | | | | 224/153 |
| 2011/0056441 | A1 * | 3/2011 | Chang | A01K 1/0245 |
| | | | | 119/453 |

* cited by examiner

*Primary Examiner* — William L Gmoser
(74) *Attorney, Agent, or Firm* — POLSINELLI LLP

(57) ABSTRACT

An improved animal carrier. An animal carrier may include a shell defining a top panel, a bottom panel, a first side panel, and a second side panel. The carrier may include a first end and a second end. The top panel may include a zippered opening extending from the first end to the second end and the bottom panel includes a semi-rigid base having an exterior side. The carrier may include an interior side. The second side panel may be positioned substantially parallel to the first side panel. The shell may define a cavity for housing an animal. A device may include feet positioned on the exterior side. At least one of the feet includes an electrical contact that is electrically connected to the interior side. The electrical contact is configurable to release static electricity from an interior of the shell.

20 Claims, 11 Drawing Sheets

110

158

170

175

174

ANIMAL CARRIER WITH ELECTROSTATIC DISCHARGE

FIELD

The present disclosure relates to an animal carrier. More specifically and without limitation, the present disclosure relates to an animal carrier that can discharge accumulated static electricity.

BACKGROUND

Animal carriers are used to transport animals such as pets around town and on trips. But over time, static electricity can build up in animal carriers, especially those made of fabric, which can make the animal uncomfortable. For example, static electricity on the material of a dog carrier bag can cause the bag to cling to the dog's fur, making it uncomfortable. In some cases, the static can cause small static shocks when the dog touches the bag. Buildup of static electricity can be most common in dry environments.

SUMMARY

Disclosed aspects relate to animal carriers. In some aspects, the techniques described herein relate to an animal carrier including: a shell defining a top panel, a bottom panel, a first side panel, and a second side panel, and including a first end and a second end, wherein: the top panel includes a zippered opening extending from the first end to the second end; the bottom panel includes a semi-rigid base having an exterior side, and includes an interior side; the second side panel is positioned substantially parallel to the first side panel; and the shell defines a cavity for housing an animal; and a plurality of feet positioned on the exterior side, wherein at least one of the plurality of feet includes an electrical contact that is electrically connected to the interior side, wherein the electrical contact is configurable to release static electricity from an interior of the shell.

In some aspects, the techniques described herein relate to an animal carrier including: a top panel including a zippered opening extending from a first end to a second end; a first side panel attached to the top panel, the first end, and the second end; a second side panel positioned substantially parallel to the first side panel and attached to the top panel, the first end, and the second end; a bottom panel positioned substantially parallel to the top panel, attached to the first side panel, the second side panel, the first end, and the second end, and including a semi-rigid base, wherein the top panel, the bottom panel, the first side panel, and the second side panel define an interior cavity; and a plurality of feet positioned on an exterior side of the bottom panel, wherein at least one of the plurality of feet includes an electrical conductor that is electrically connected to an interior side of the animal carrier.

In some aspects, the techniques described herein relate to an animal carrier including: a top panel; a bottom panel positioned substantially parallel to the top panel and including an exterior side, including a plurality of feet are positioned on the exterior side, wherein at least one of the plurality of feet includes an electrical conductor that is electrically connected to an interior side of the animal carrier; a first end; a second end positioned opposite the first end; a pair of side panels, each side panel attached to the top panel, the bottom panel, the first end, and the second end, wherein: the bottom panel includes a semi-rigid base, and the top panel, the bottom panel, and the side panels together define an interior cavity, the animal carrier further includes a first flap positioned at the first end, attached at a top of the first end, and releasably attached to a bottom of the first end, the first end includes a first end portion and a zippered opening extending substantially around a perimeter of the first end portion, and the second end includes a second end portion, wherein the second end portion includes a second mesh portion and a second closed portion.

Various embodiments of the disclosure are discussed in detail below. While specific implementations are discussed, such implementations are for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described to avoid obscuring the description. References to one or an embodiment in the present disclosure can be references to the same embodiment or any embodiment; and such references mean at least one of the embodiments.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Figure 1:
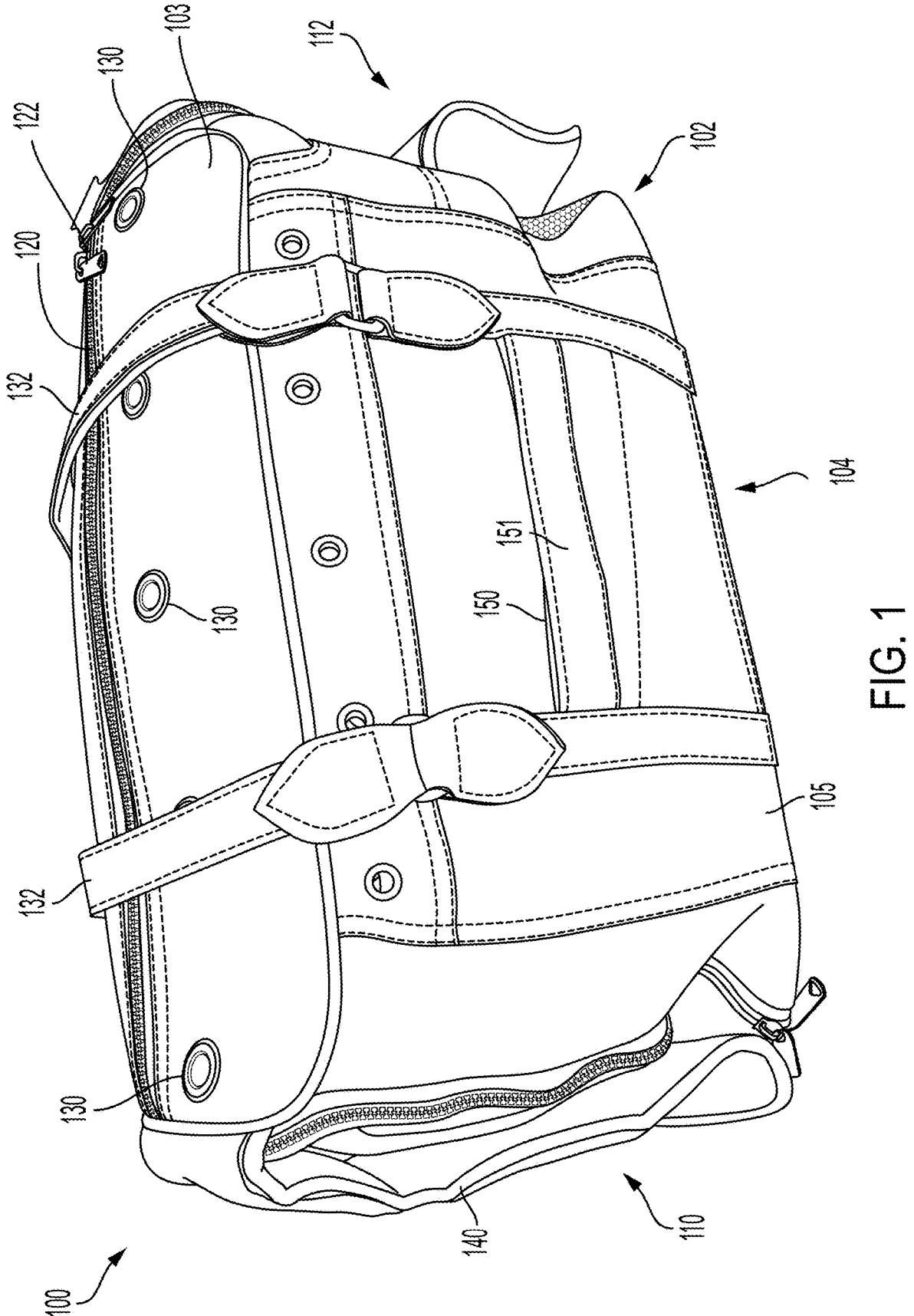
FIG. 1 depicts a side view of an animal carrier, in accordance with aspects of the present disclosure.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Disclosed embodiments relate to improved animal carriers, including animal carriers that provide electrical conductors through which static electricity may be discharged. As discussed above, electrostatic discharge (ESD) can affect animals, though the impact depends on the strength of the discharge and the sensitivity of the animal. Like humans, animals can feel a small static shock (e.g., from touching metal or synthetic materials). This can startle them or cause brief discomfort, especially in dry environments where static buildup is more likely. ESD can also cause anxiety or stress in animals. For instance, an animal exposed to ESD may become anxious or avoid certain areas if the animal associates the areas with receiving shocks. This is particularly common when walking on synthetic carpets or getting into or out of cars. In extreme cases, ESD can cause harm to animals.

Discharging static electricity can involve touching a grounded object such as a metal pipe, or grounded appliance. But an animal traveling in a animal carrier is not in contact with a grounded object, therefore allowing static to accumulate. As discussed further herein, certain embodiments provide improvements relative to existing animal carriers by providing a mechanism for conducting and discharging static electricity. Such static electricity may have built up, for example, from the animal carrier touching other surfaces or from a person carrying the animal carrier.

Referring to FIGS. 1-11, an animal carrier 100 is depicted in accordance with aspects of the present disclosure. Animal carrier 100 includes a top panel 103, a bottom panel 104, a pair of side panels (first side panel 105 and a second side panel 106), and two opposing ends or end portions (first end 110 and second end 112). As discussed below, animal carrier 100 may be formed of a soft-sided material but with rigidity (e.g., semi-rigidity) sufficient to maintain an interior area or cavity into which an animal, such as a dog or a cat, may be placed for transport. First end 110 and second end 112 may be sized to permit placement and removal of a pet from pet carrier, thereby providing egress. In some cases, animal carrier 100 may be referred to as the Alpha Wave Bag product.

Figure 2:
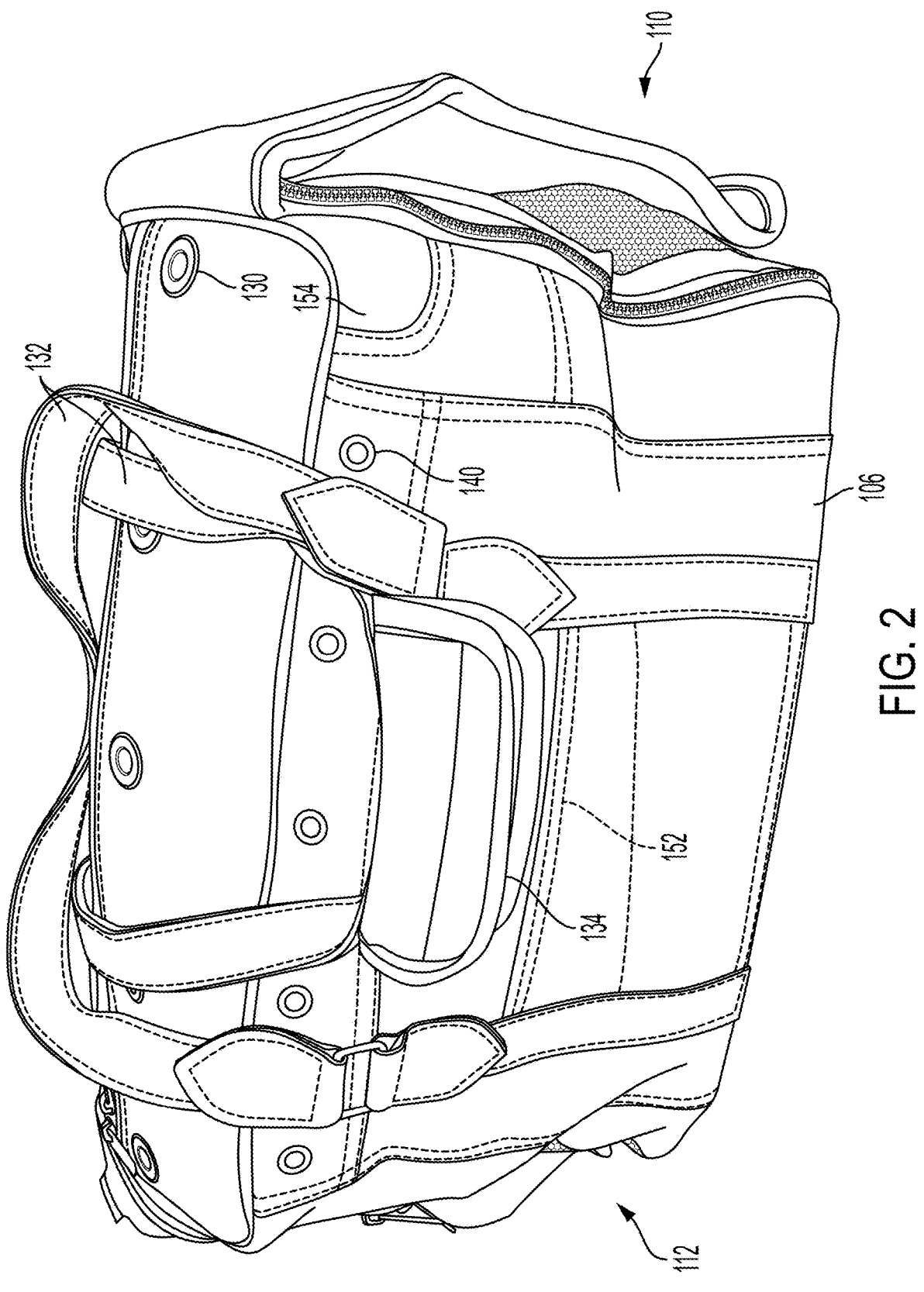
FIG. 2 depicts an additional side view of an animal carrier, in accordance with aspects of the present disclosure.

FIGS. 1-2 depict different side views of an animal carrier 100, in accordance with aspects of the present disclosure. As depicted, side panel 105 and side panel 106 are positioned and/or attached such that side panel 105 and side panel 106 are substantially parallel to each other. Similarly, top panel 103 and bottom panel 104 may be substantially parallel to each other. Side panels 105 and 106 may be approximately the same size, substantially rectangular in shape, and/or substantially parallel to each other. First end 110 and second end 112 may be approximately the same size, substantially rectangular in shape, and/or substantially parallel to each other.

Animal carrier 100 may be formed of a shell 102. Top panel 103, bottom panel 104, first side panel 105, and second side panel 106 may be collectively referred to shell 102. Shell 102 can extend from side panel 105, to top panel 103, to a second side panel 106, to bottom panel 104. Shell 102 may be formed from a single piece (segment) of material that forms side panel 105, top panel 103, second side panel, and bottom panel 104. In other aspects, shell 102 is formed of multiple pieces of material. For example, top panel 103, bottom panel 104, first side panel 105, and/or second side panel 105 may each be formed from a respective piece of material and are affixed, stitched, or otherwise connected to each other.

Segments of the animal carrier 100 may be fabricated from one or more materials, natural or synthetic. Examples of suitable materials include cotton, denim, nylon, hemp, canvas, leather, vegan leather, polyester, vinyl, plastic, and so forth. The segments may be connected to each other by stitching, adhesive, zipper, hook and loop, or by any other mechanism. Examples of suitable colors of the material of the animal carrier 100 include blue (e.g., blue denim), red, green, and black. The animal carrier may be multiple colors. In some cases, the stitching is orange or brown. In some cases, certain components of animal carrier 100 may be made with reinforcement formed of rigid materials such as metal or plastic. In some cases, as discussed below, electrically conductive materials such as metal wires may be used to facilitate discharge of static electricity.

Top panel 103 includes re-closable opening 120 which extends from proximate to the first end 110 to proximate to the second end 112. Opening 120 may include one or more zippers 122. Opening 120 can be configured with a single slider (e.g., one zipper 122) or a dual zipper configuration (e.g., two zippers 122). Opening 120 may include weatherproofing features, such as fully sealed zipper teeth and/or a layer or flap of material positioned on a top of the opening 120. Re-closable opening 120 allows an animal and/or belongings to be placed into animal carrier 100 via the top panel 103 downward.

In some aspects, top panel 103 includes one or more air openings 130 to allow air to enter and/or exit from the interior. As depicted, five air openings 130 are present. But any number of air openings is possible. Each air opening 130 can be formed by a rivet such as flush rivet, or a self-piercing rivet. Other examples are possible.

Bottom panel 104 may be formed of a hard or rigid material to provide stability to the animal carrier 100. For instance, bottom panel 104 may be formed of a material sufficient to maintain the animal carrier 100 in an upright position. As further explained with respect to FIGS. 8-11, bottom panel 104 can include one or more feet to raise the bottom panel 104 from any surface below. These feet may include one or more electrical conducts to dissipate static electricity to a ground surface.

Animal carrier 100 can include one or more side pockets (outer pockets). For instance, as depicted, side panel 105 includes pocket 150 and side panel 106 includes pocket 152. Each pocket 150 and 152 may be closeable via a fastener and/or a zipper such that items cannot fall out if the carrier is tipped. Side pockets 150, 152 may be useful for carrying small items such as small leashes, pet medicines, pet accessories, food packets, water bottles, collapsible food and water feeding containers, and so forth. In some cases, the pockets are formed of mesh or elastic mesh and/or are provided with fasteners for added security.

In some aspects, animal carrier 100 includes one or more inner pockets (not depicted). The inner pockets may be on an interior of side panel 105 and 106. In some aspects, a lead with clip is located within animal carrier 100, for instance, to affix a leash.

In some aspects, one or more of side pockets 150, 152 includes a grab handle 151 attached on an exterior side of the side pocket. Grab handle 151 can facilitate easy access to the carrier. For instance, grab handle 151 may be used to pull animal carrier 100 from under a seat.

In some aspects, animal carrier 100 includes end pockets 154, 155. End pockets 154 and 155 may be used for storing small items, e.g., treats. In some cases, end pockets 154 and 155 are colored a different color than the other material used for animal carrier 100.

Side panel 105, 106 may be formed of one or more pieces or components. For instance, as depicted, side panel 105 is formed of an upper piece, on which air openings 140 are provided, a lower piece, on which pocket 150 is placed, and two side pieces, one on each side. These pieces may be connected to each other. Similarly, side panel 106 may include pocket 152 and any air openings 140. In some aspects, the side panels are created each from a single piece of material and the components separated by stitching.

Shell 102 may form two ends, a first end 110 and a second end 112. Each end 110 and 112 provide entry and exit points for an animal and/or belongings. As further explained, end 110 and end 112 may differ in closure mechanisms and/or mesh, providing additional flexibility. In some aspects, first end 110 and/or second end 112 may include an attachment configured to receive a cushioned insert.

Animal carrier 100 may be provided with fittings for the attachment of carrying handles and/or straps. For instance, animal carrier 100 can include one or more straps 132. Two straps are depicted. Straps 132 are attached to side panel 106 at one end, and second side panel 106 and extend freely over top panel 103. In one example, each strap 132 may include three portions: a first portion attached to side panel 105, a second portion coupled to the first portion and extending over top panel 103 and connected to a third portion that is attached to second side panel 106. The portions may be connected via one or more buckles. The second portions may be connected to each other by a removable handle 134.

Straps 132 or a portion thereof may be removable. The removed portion can then be placed in a pocket of the animal carrier 100, thereby easing the process of carrying animal carrier 100. Removable straps may be conveniently stored inside of the carrier when it is not in use. Removable straps may be stored in a pocket of the carrier (e.g., side pocket 150, 152), removing a trip hazard, for instance, when the carrier is placed beneath an airplane seat. In other cases, animal carrier 100 may be provided with shoulder straps and handles that are permanently sewn to the carrier. Additional straps are possible such as straps that affix into a vehicle. Straps 132 may be adjustable. The straps 132 may be adjusted to a short length for carrying via hand or adjusted to a longer length for carrying over a shoulder of the user.

Figure 3:
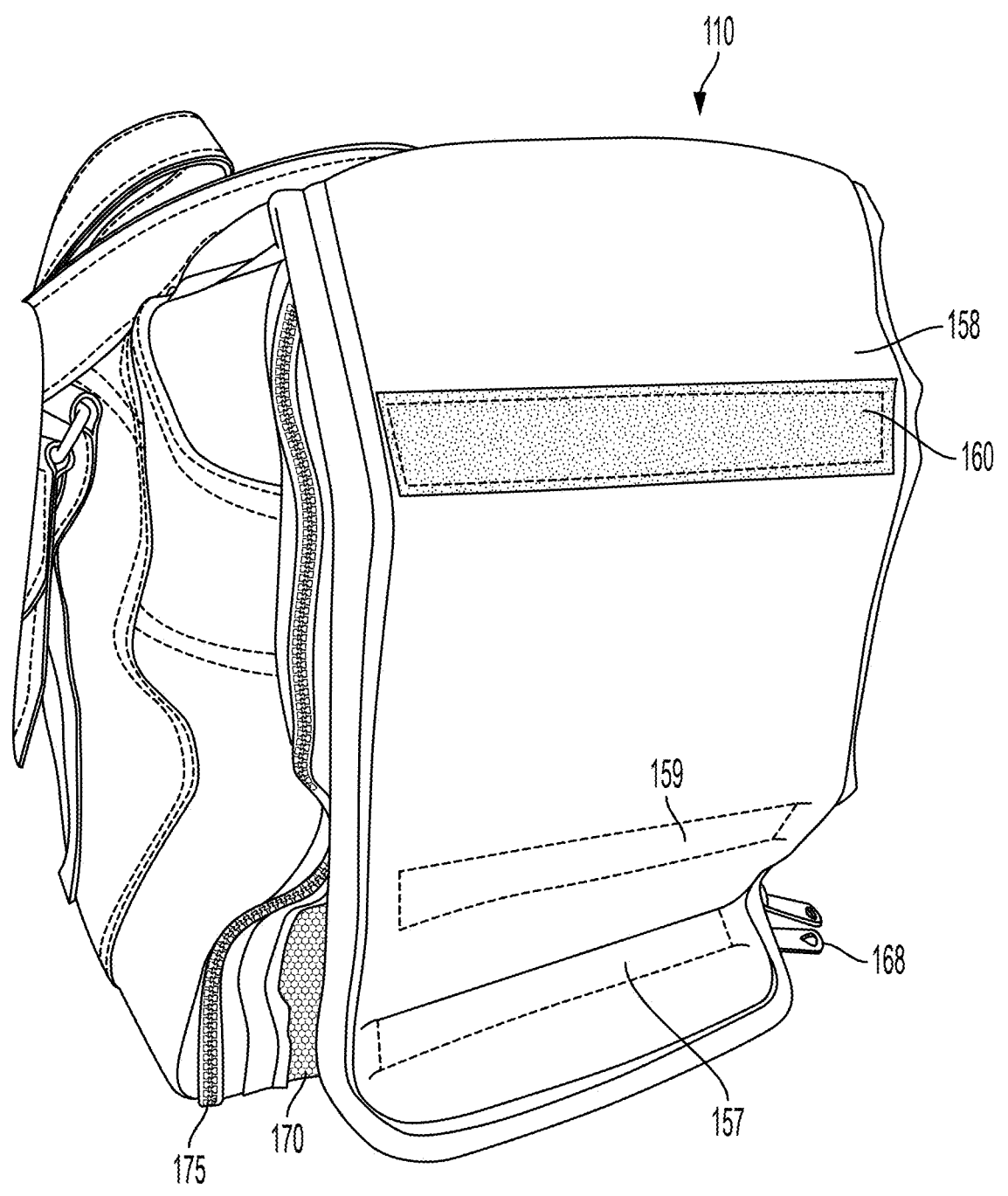
FIG. 3 depicts a view of a first end of an animal carrier, in accordance with aspects of the present disclosure.
Figure 4:
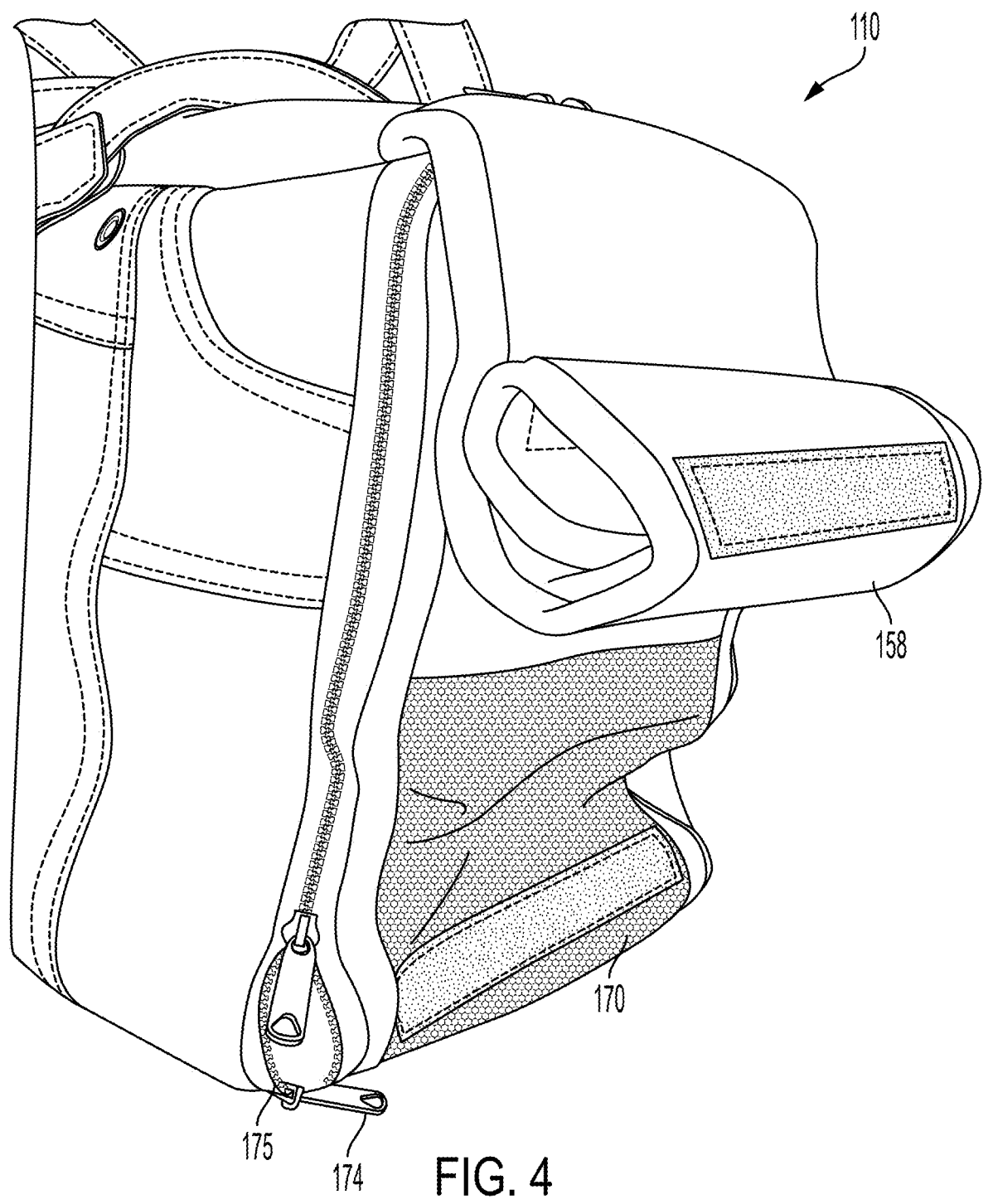
FIG. 4 depicts an additional view of the first end of an animal carrier, in accordance with aspects of the present disclosure.
Figure 5:
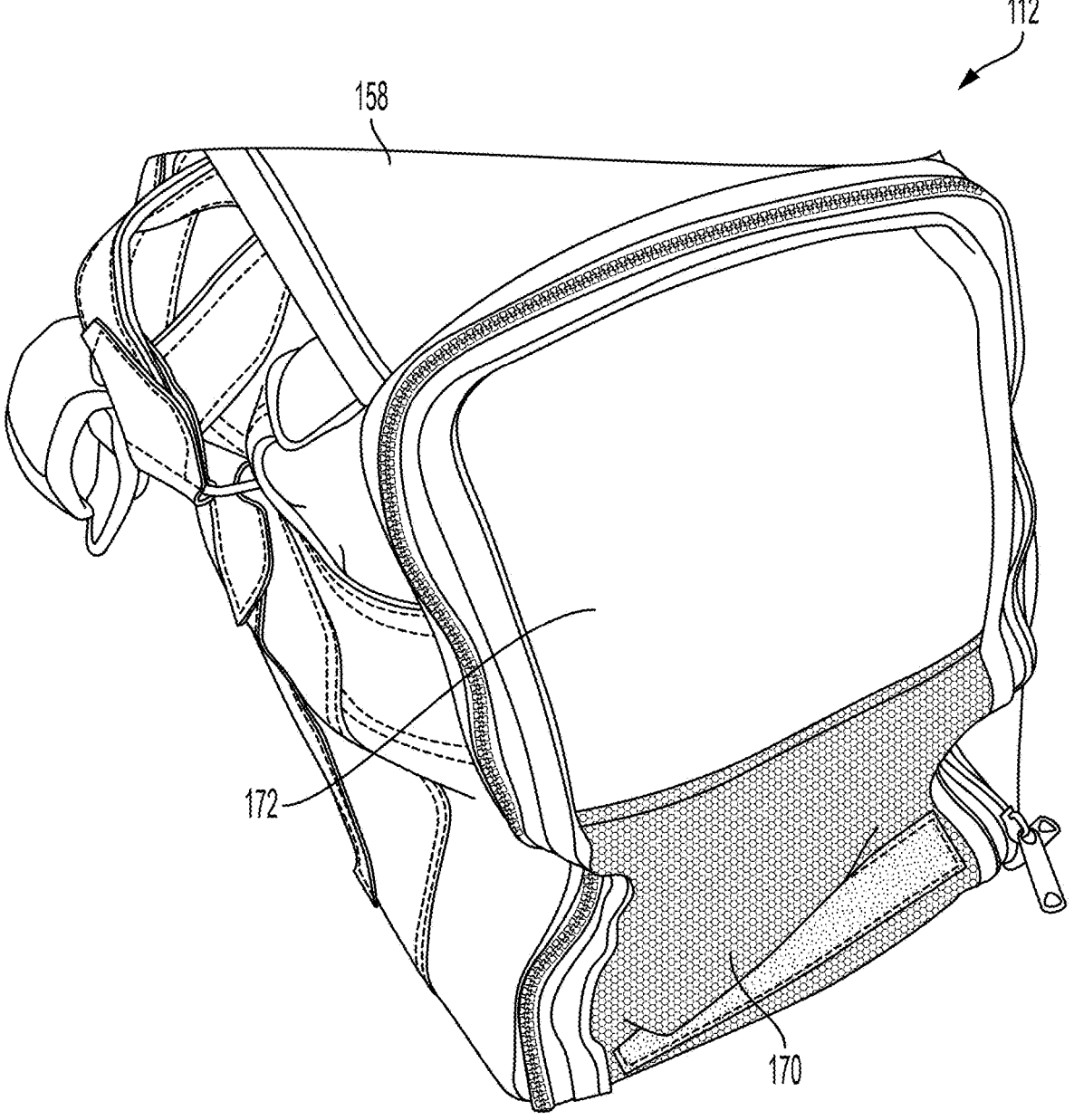
FIG. 5 depicts an additional view of the first end of an animal carrier, in accordance with aspects of the present disclosure.

FIGS. 3-5 depict views of a first end 110 of an animal carrier, in accordance with aspects of the present disclosure. First end 110 includes a first flap 158, which as explained herein, may be lifted or rolled up for convenience or to allow airflow into animal carrier 100. First flap 158 is attached to a top portion of the first end 110. First flap 158 is releasably attachable to a bottom end of the first end 110. As depicted, flap 158 opens top-up, but other configurations are possible.

FIG. 3 depicts flap 158 in closed form, whereas FIG. 4 depicts flap 158 in opened form. FIG. 5 depicts flap 158 fully open and placed on top of top panel 103. Flap 158 may include a fastener 160 (e.g., hook and loop) positioned on the outward-facing side, and fasteners 157 and 159 (e.g., hook and loop) on an inner-facing side of flap 158. As depicted in FIG. 4, when flap 158 is rolled up, fasteners 157 and/or 159 may be attached to fastener 160 to support the weight of flap 158. Examples of hook and loop include Velcro. Other examples are possible.

End 110 may include mesh portion 170 and closed portion 172. As depicted, mesh portion 170 and closed portion 170 are positioned under flap 158. Mesh portion is formed of a mesh material such that an animal on the interior of animal carrier 100 may see outside and such that air may flow freely. Together, mesh portion 170 and closed portion 172 include zippered opening 175, which may include one or more zipper pulls 174. Zippered opening 175 extends around or substantially around a perimeter of first end 110.

Mesh portion 170 and closed portion 172 are revealed when flap 158 is moved aside, for example, by being rolled or lifted up. Flap 158 may be opened by opening zippered opening 175. When flap 158 is open, mesh portion 170 then allows air to flow freely between the interior area of animal carrier 100 and the exterior, improving breathability. By contrast, maintaining the flap 158 in the closed position may help improve heat retention, for example, in cold weather. Additionally, maintaining flap 158 in the closed position may shield light from entering the carrier, thereby improving sleep for the animal within.

As depicted, mesh portion 170 and closed portion 172 open bottom-down in the depicted configuration. But other configurations are possible. For instance, mesh portion 170 and closed portion 172 could be attached to a top portion of the first end 110 and open top-up.

Figure 6:
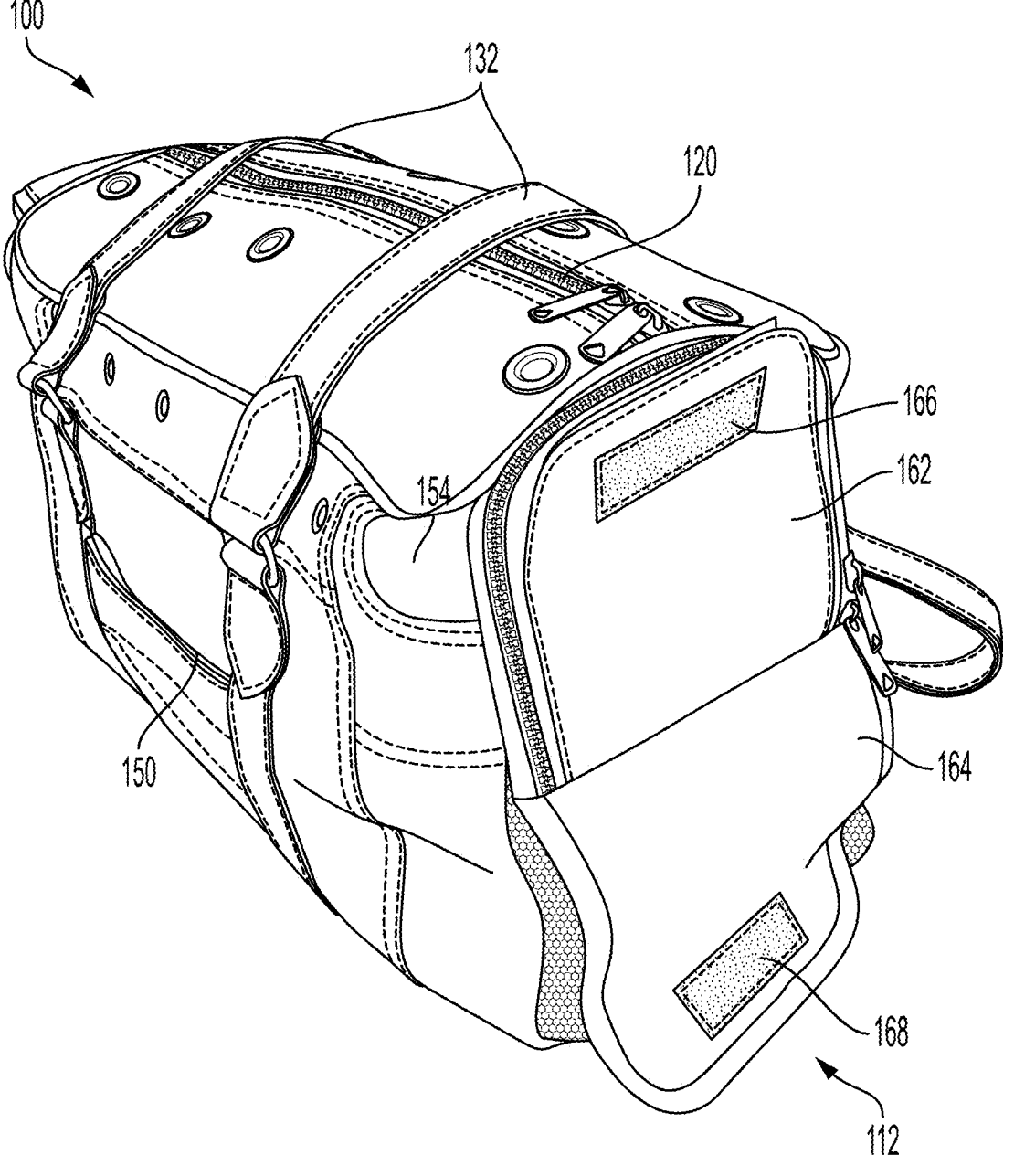
FIG. 6 depicts a view of a second end of an animal carrier, in accordance with aspects of the present disclosure.
Figure 7:
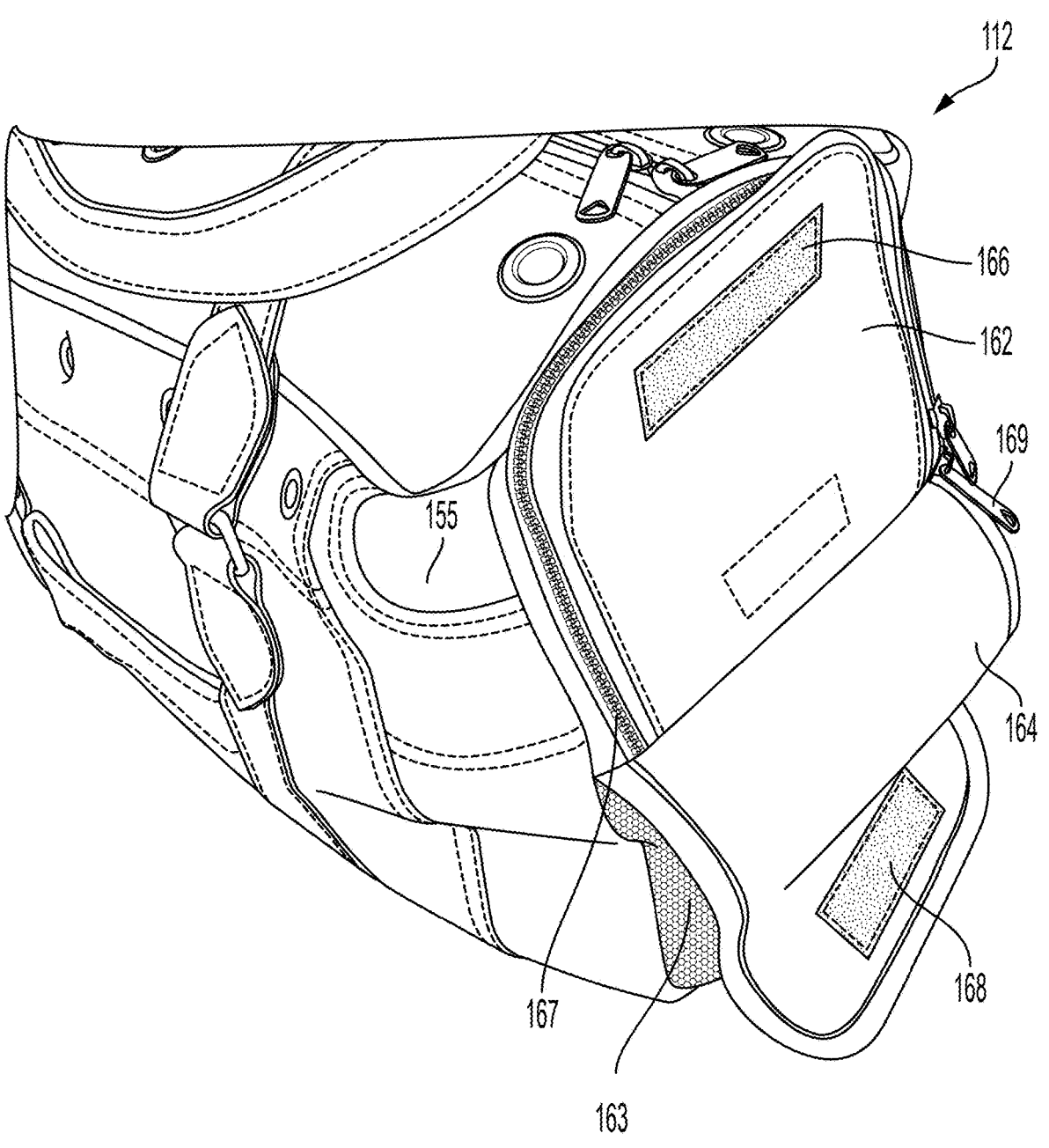
FIG. 7 depicts an additional view of the second end of an animal carrier, in accordance with aspects of the present disclosure.

FIGS. 6 and 7 depict views of a second end of an animal carrier, in accordance with aspects of the present disclosure. Second end 112 includes portion 162 and half flap 164. Half flap 164 can be moved upward or downward as needed. For instance, half flap 164 may open upwards, thereby revealing the mesh portion 163 underneath. The flap 164 is releasably attachable to closed portion 162. In an example, half flap 164 may be affixed to closed portion 162 via a hook and loop fastener 168 contacting hook and loop fastener 166 on portion 162. In this configuration, half flap 164 uncovers the mesh portion 163 below.

Second end 112 includes zippered opening 167, which extends around or substantially around a perimeter of the second end. Zippered opening 167 may have one or more zipper pulls 169. Zippered opening 167 may have a single or double zippered opening. Zipper 169 may be pulled, thereby opening zippered opening 167, which opens portion 162, allowing airflow.

In some aspects, animal carrier 100 includes a leash or keyring attachment. The attachment may be on the interior or the exterior of animal carrier 100. This provides an attachment for additional items to the carrier. In some cases, this attachment is located immediately inside the first end 110. The attachment can include a long (e.g., ½ to 1 foot in length) strap with a keychain or other attachment at the end.

Figure 8:
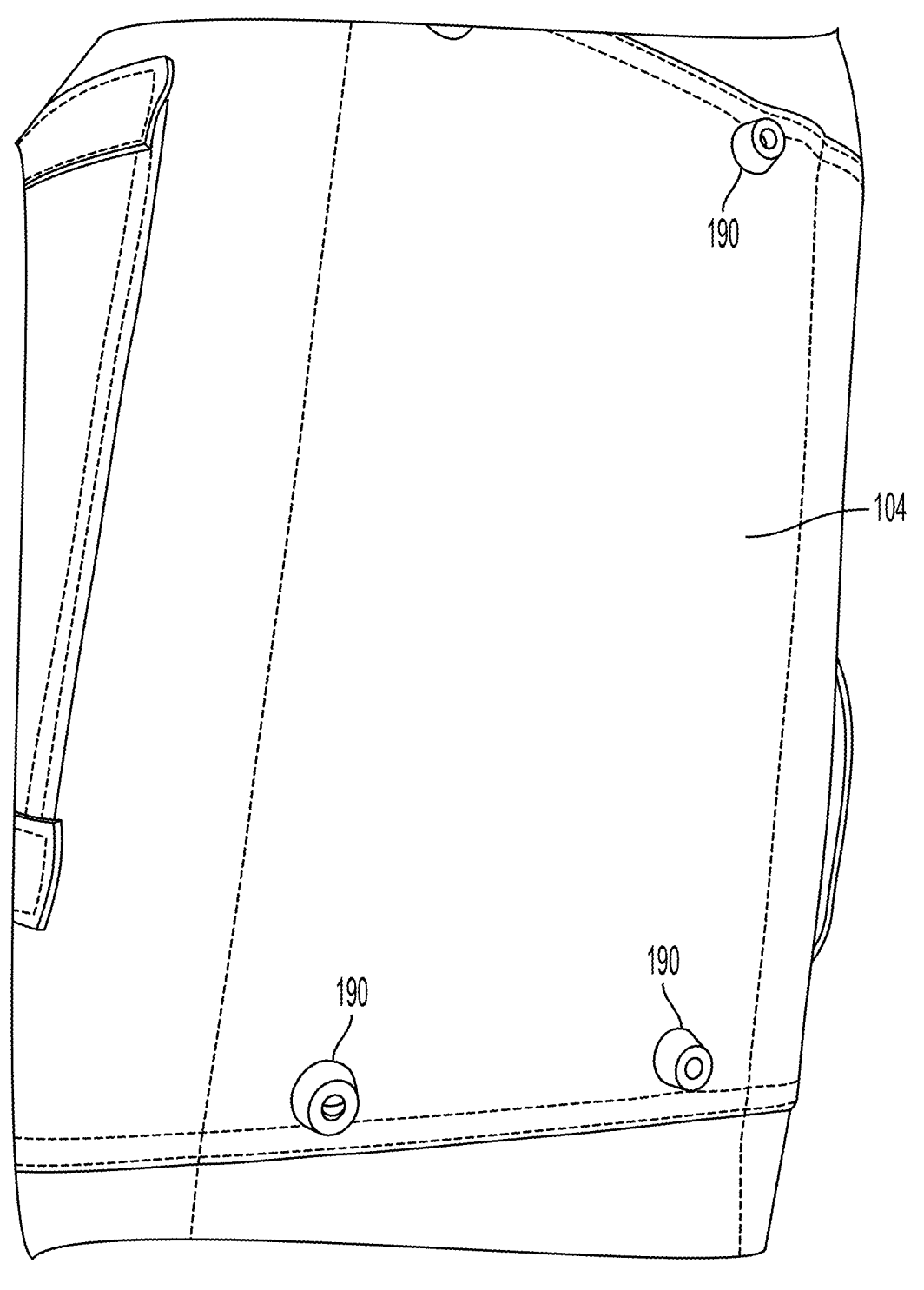
FIG. 8 depicts a view of a bottom panel of the animal carrier, in accordance with aspects of the present disclosure.

FIG. 8 depicts a view of a bottom panel 104 of the animal carrier, in accordance with aspects of the present disclosure. FIG. 8 further depicts one or more feet 190. While four feet 190 are depicted, any number is possible. Feet 190 are positioned on the exterior side of bottom panel 104, providing support to animal carrier 100 when carrier is placed on a surface such as a floor or a table. Feet 190 may be formed of any suitable material such as plastic, rubber, and so forth.

Figure 9:
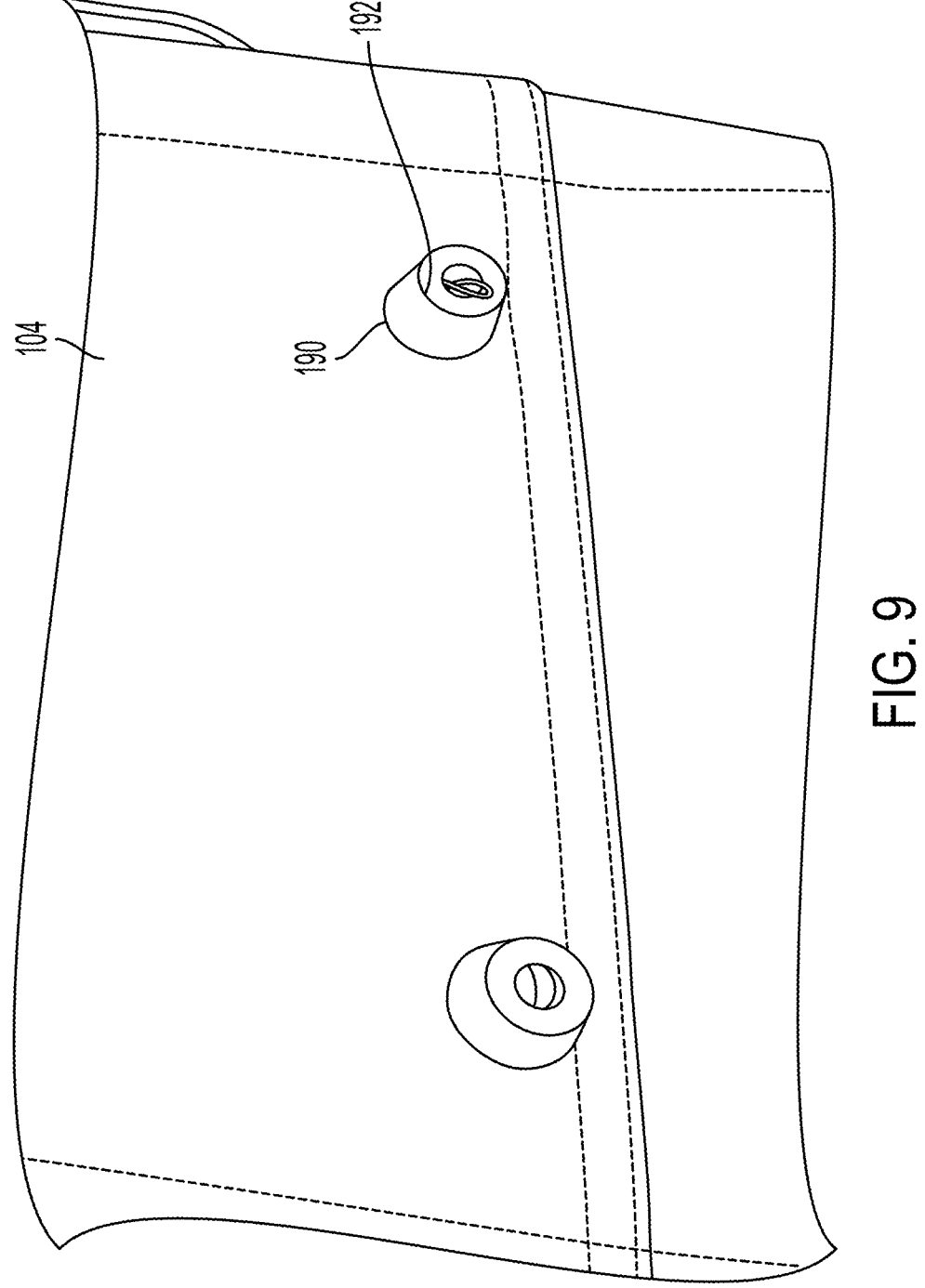
FIG. 9 depicts an additional view of the bottom panel of the animal carrier, in accordance with aspects of the present disclosure.

FIG. 9 depicts an additional view of the bottom panel 104 of the animal carrier, in accordance with aspects of the present disclosure. As can be seen, one of the feet 190 includes an electrical conductor 192 positioned within the feet 190. Electrical conductor 192 is formed of a conducting material such as copper, silver, gold, and so forth. Electrical conductor 192 extends from inside the foot 190 into an interior of the animal carrier 100, where electrical conductor 192 may be connected to additional electrical conductor(s) that extend within and/or throughout the interior.

For example, electrical conductor 192 may be electrically connected to one or more points within animal carrier 100. For example, electrical conductor 192 may be electrically connected to a side panel, an end panel, and a bottom. In this manner, static electricity from different surfaces may be transmitted down conductor 192 to an exterior of the bag.

Figure 10:
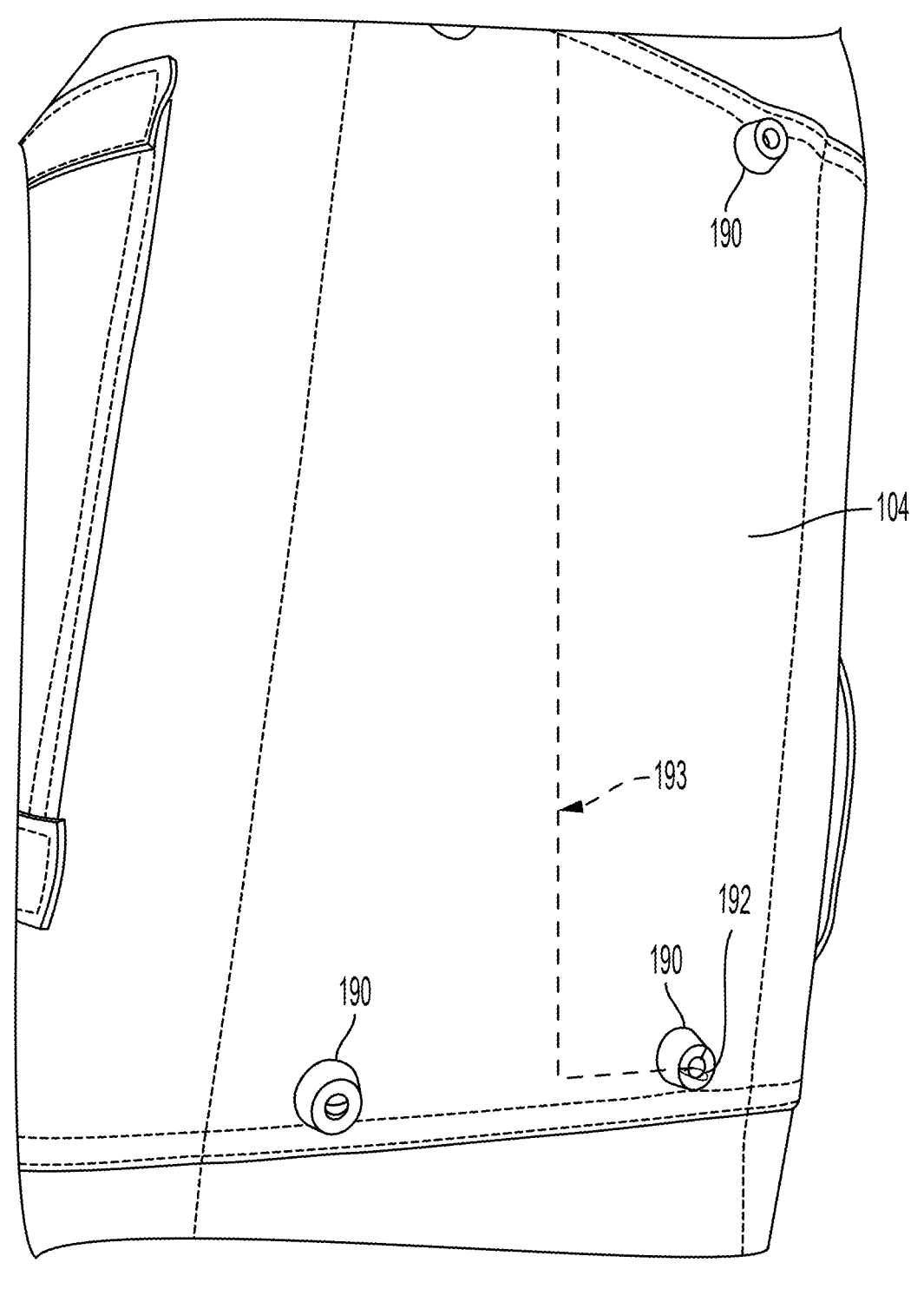
FIG. 10 depicts an additional view of the bottom panel of the animal carrier, in accordance with aspects of the present disclosure.

FIG. 10 depicts an additional view of the bottom panel 104 of the animal carrier, in accordance with aspects of the present disclosure. As depicted, one of the feet 190 includes an electrical conductor 193 that is connected to electrical conductor 192. Electrical conductor 193 extends across a length of the animal carrier 100. In some cases, not depicted, electrical conductor 193 may cross once or more laterally across animal carrier 100. Other examples are possible. For instance, electrical conductor 193 may zig-zag around one or more interior surfaces within the carrier.

Figure 11:
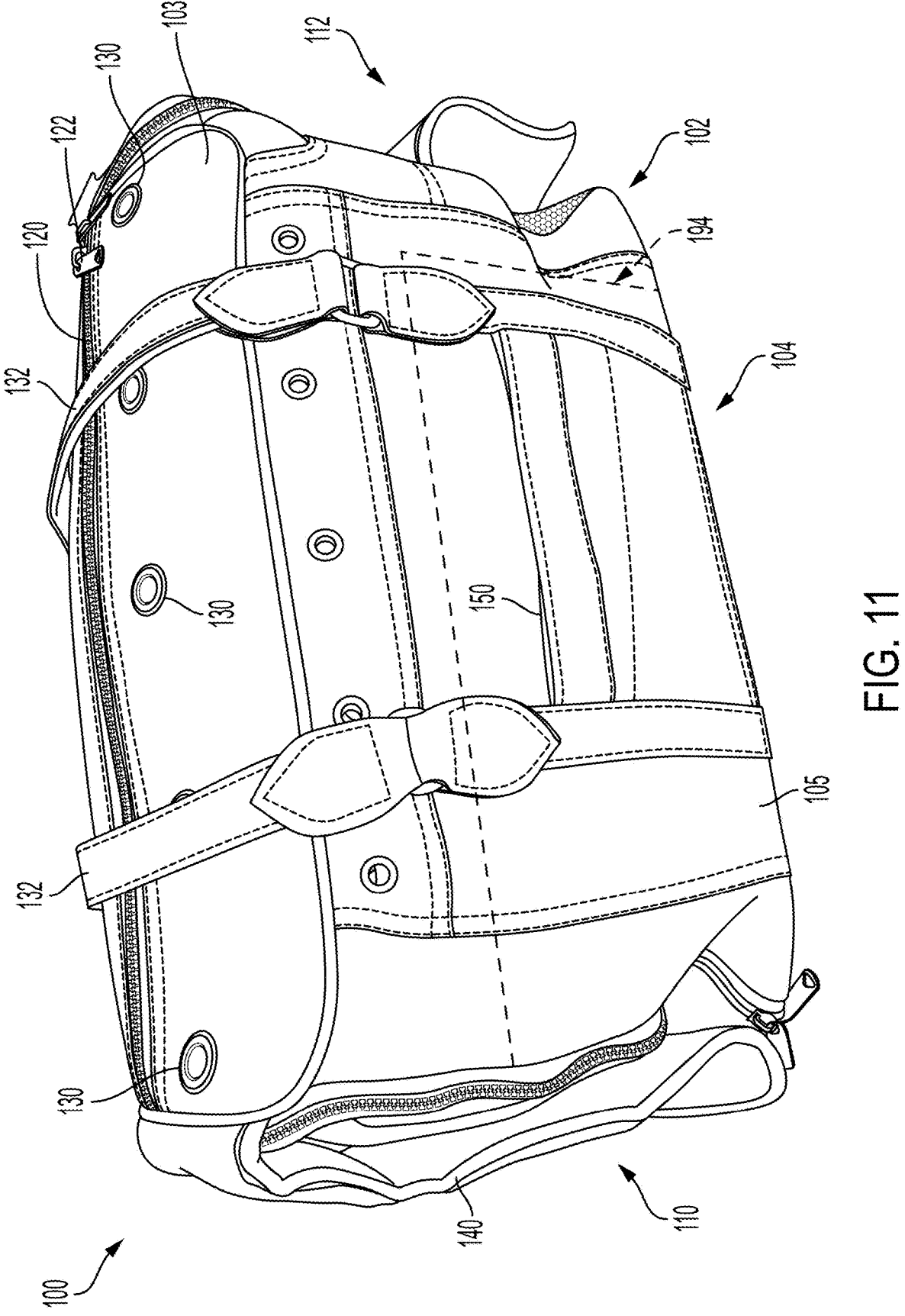
FIG. 11 depicts an additional side view of an animal carrier, in accordance with aspects of the present disclosure.

FIG. 11 depicts an additional side view of animal carrier 100, in accordance with aspects of the present disclosure. Electrical conductor 194 extends upwards from bottom panel 104 towards the top panel 103 and then extends lengthwise from the second end 112 to the first end 110. Electrical conductor 194 can connect to any internal panel or surface within the animal carrier 100.

The above description and drawings are illustrative and are not to be construed as limiting or restricting the subject matter to the precise forms disclosed. Persons skilled in the relevant art can appreciate that many modifications and variations are possible in light of the above disclosure and may be made thereto without departing from the broader scope of the embodiments as set forth herein. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

As used herein, the terms "a" and "an" and "the" and other such singular referents are to be construed to include both the singular and the plural, unless otherwise indicated herein or clearly contradicted by context.

As used herein, the terms "comprising," "having," "including," and "containing" are to be construed as open-ended (e.g., "including" is to be construed as "including, but not limited to"), unless otherwise indicated or clearly contradicted by context.

As used herein, the recitation of ranges of values is intended to serve as a shorthand method of referring individually to each separate value falling within the range, unless otherwise indicated or clearly contradicted by context. Accordingly, each separate value of the range is incorporated into the specification as if it were individually recited herein.

As used herein, the use of examples or exemplary language (e.g., "such as" or "as an example") is intended to more clearly illustrate embodiments and does not impose a limitation on the scope unless otherwise claimed. Such language in the specification should not be construed as indicating any non-claimed element is required for the practice of the embodiments described and claimed in the present disclosure.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based heron. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The foregoing detailed description of the technology has been presented for purposes of illustration and description. It is not intended to be exhaustive or to limit the technology to the precise form disclosed. Many modifications and variations are possible in light of the above teaching. The described embodiments were chosen to best explain the principles of the technology, its practical application, and to enable others skilled in the art to utilize the technology in various embodiments and with various modifications as are suited to the particular use contemplated. It is intended that the scope of the technology be defined by the claim.

One or more illustrative aspects include:

Aspect 1. An animal carrier comprising: a shell defining a top panel, a bottom panel, a first side panel, and a second side panel, and including a first end and a second end, wherein: the top panel includes a zippered opening extending from the first end to the second end; the bottom panel includes a semi-rigid base having an exterior side, and includes an interior side; the second side panel is positioned substantially parallel to the first side panel; and the shell defines a cavity for housing an animal; and a plurality of feet positioned on the exterior side, wherein at least one of the plurality of feet includes an electrical contact that is electrically connected to the interior side, wherein the electrical contact is configurable to release static electricity from an interior of the shell.

Aspect 2. The animal carrier of Aspect 1, wherein the animal carrier further includes a first flap positioned at the first end, attached at a top of the first end, and releasably attached to a bottom of the first end.

Aspect 3. The animal carrier of Aspect 2, wherein the first end includes a first end portion and a zippered opening extending substantially around a perimeter of the first end portion.

Aspect 4. The animal carrier of Aspect 3, wherein when in a closed position, the first flap substantially covers the zippered opening, and wherein the first end portion includes a first mesh portion and a first closed portion.

Aspect 5. The animal carrier of Aspect 2, wherein the first end includes a first end portion, wherein the first end portion includes a first mesh portion, and wherein the first flap is configurable to be rolled up and positioned above the first mesh portion.

Aspect 6. The animal carrier of any of Aspects 1-5, wherein the second end includes a second end portion, wherein the second end portion includes a second mesh portion and a second closed portion.

Aspect 7. The animal carrier of Aspect 6, wherein the second end includes a second zippered opening extending substantially around a perimeter of the second end portion.

Aspect 8. The animal carrier of any of Aspects 1-7, wherein the semi-rigid base is configured to maintain the animal carrier upright.

Aspect 9. The animal carrier of any of Aspects 1-8, further comprising a plurality of carry straps, wherein each carry strap includes a first strap end attached to the first side panel and a second strap end attached to the second side panel.

Aspect 10. The animal carrier of any of Aspects 1-9, further comprising one or more openings for air positioned on one or more of the top panel, the first side panel, or the second side panel.

Aspect 11. The animal carrier of any of Aspects 1-10, wherein one or more of the first side panel and the second side panel include an attachment configured to receive a cushioned insert.

Aspect 12. The animal carrier of any of Aspects 1-11, wherein one or more of the first side panel and the second side panel comprise an interior side, wherein the interior side comprises a pocket.

Aspect 13. The animal carrier of any of Aspects 1-12, wherein one or more of the first side panel and the second side panel comprise an outer pocket.

Aspect 14. An animal carrier comprising: a top panel including a zippered opening extending from a first end to a second end; a first side panel attached to the top panel, the first end, and the second end; a second side panel positioned substantially parallel to the first side panel and attached to the top panel, the first end, and the second end; a bottom panel positioned substantially parallel to the top panel, attached to the first side panel, the second side panel, the first end, and the second end, and including a semi-rigid base, wherein the top panel, the bottom panel, the first side panel, and the second side panel define an interior cavity; and a plurality of feet positioned on an exterior side of the bottom panel, wherein at least one of the plurality of feet includes an electrical conductor that is electrically connected to an interior side of the animal carrier.

Aspect 15. The animal carrier of Aspect 14, wherein the animal carrier further includes a first flap positioned at the first end, attached at a top of the first end, and releasably attached to a bottom of the first end.

Aspect 16. The animal carrier of Aspect 15, wherein the first end includes a first end portion and a zippered opening extending substantially around a perimeter of the first end portion.

Aspect 17. The animal carrier of Aspect 16, wherein when in a closed position, the first flap substantially covers the zippered opening, and wherein the first end portion includes a first mesh portion and a first closed portion.

Aspect 18. The animal carrier of of any of Aspects 1-17, wherein the first end comprises a first end portion and a zippered opening extending substantially around a perimeter of the first end portion, wherein the first end portion includes a first mesh portion and a first closed portion, wherein the second end includes a second end portion, wherein the second end portion includes a second mesh portion and a second closed portion, and wherein the second closed portion includes a second zippered opening extending substantially around a perimeter of the second closed portion.

Aspect 19. An animal carrier comprising: a top panel; a bottom panel positioned substantially parallel to the top panel and including an exterior side, comprising a plurality of feet are positioned on the exterior side, wherein at least one of the plurality of feet includes an electrical conductor that is electrically connected to an interior side of the animal carrier; a first end; a second end positioned opposite the first end; a pair of side panels, each side panel attached to the top panel, the bottom panel, the first end, and the second end, wherein: the bottom panel includes a semi-rigid base, and the top panel, the bottom panel, and the side panels together define an interior cavity, the animal carrier further includes a first flap positioned at the first end, attached at a top of the first end, and releasably attached to a bottom of the first end, the first end includes a first end portion and a zippered opening extending substantially around a perimeter of the first end portion, and the second end includes a second end portion, wherein the second end portion includes a second mesh portion and a second closed portion.

Aspect 20. The animal carrier of Aspect 19, further comprising: a plurality of carry straps, wherein each carry strap includes a first strap end attached to the first side panel and a second strap end attached to the second side panel; and one or more openings for air positioned on one or more of the top panel, the first side panel, or the second side panel, wherein one or more of the first side panel and the second side panel include an attachment configured to receive a cushioned insert.

What is claimed is:

1. An animal carrier comprising:
a shell defining a top panel, a bottom panel, a first side panel, and a second side panel, and including a first end and a second end, wherein:
the top panel includes a zippered opening extending from the first end to the second end;
the bottom panel includes a semi-rigid base having an exterior side, and includes an interior side;
the second side panel is positioned substantially parallel to the first side panel; and
the shell defines a cavity for housing an animal; and
a plurality of feet positioned on the exterior side, wherein at least one of the plurality of feet includes an electrical contact that is electrically connected to the interior side, wherein the electrical contact is configurable to release static electricity from an interior of the shell.

2. The animal carrier of claim 1, wherein the animal carrier further includes a first flap positioned at the first end, attached at a top of the first end, and releasably attached to a bottom of the first end.

3. The animal carrier of claim 2, wherein the first end includes a first end portion and an additional zippered opening extending substantially around a perimeter of the first end portion.

4. The animal carrier of claim 3, wherein when in a closed position, the first flap substantially covers the zippered opening, and wherein the first end portion includes a first mesh portion and a first closed portion.

5. The animal carrier of claim 2, wherein the first end includes a first end portion, wherein the first end portion includes a first mesh portion, and wherein the first flap is configurable to be rolled up and positioned above the first mesh portion.

6. The animal carrier of claim 1, wherein the second end includes a second end portion, wherein the second end portion includes a second mesh portion and a second closed portion.

7. The animal carrier of claim 6, wherein the second end includes a second zippered opening extending substantially around a perimeter of the second end portion.

8. The animal carrier of claim 1, wherein the semi-rigid base is configured to maintain the animal carrier upright.

9. The animal carrier of claim 1, further comprising a plurality of carry straps, wherein each carry strap includes a first strap end attached to the first side panel and a second strap end attached to the second side panel.

10. The animal carrier of claim 1, further comprising one or more openings for air positioned on one or more of the top panel, the first side panel, or the second side panel.

11. The animal carrier of claim 1, wherein one or more of the first side panel and the second side panel include an attachment configured to receive a cushioned insert.

12. The animal carrier of claim 1, wherein one or more of the first side panel and the second side panel comprise an additional interior side, wherein the additional interior side comprises a pocket.

13. The animal carrier of claim 1, wherein one or more of the first side panel and the second side panel comprise an outer pocket.

14. An animal carrier comprising:
a top panel including a zippered opening extending from a first end to a second end;
a first side panel attached to the top panel, the first end, and the second end;
a second side panel positioned substantially parallel to the first side panel and attached to the top panel, the first end, and the second end;
a bottom panel positioned substantially parallel to the top panel, attached to the first side panel, the second side panel, the first end, and the second end, and including a semi-rigid base, wherein the top panel, the bottom panel, the first side panel, and the second side panel define an interior cavity; and
a plurality of feet positioned on an exterior side of the bottom panel, wherein at least one of the plurality of feet includes an electrical conductor that is electrically connected to an interior side of the animal carrier.

15. The animal carrier of claim 14, wherein the animal carrier further includes a first flap positioned at the first end, attached at a top of the first end, and releasably attached to a bottom of the first end.

16. The animal carrier of claim 15, wherein the first end includes a first end portion and an additional zippered opening extending substantially around a perimeter of the first end portion.

17. The animal carrier of claim 16, wherein when in a closed position, the first flap substantially covers the zippered opening, and wherein the first end portion includes a first mesh portion and a first closed portion.

18. The animal carrier of claim 14, wherein the first end comprises a first end portion and a second zippered opening extending substantially around a perimeter of the first end portion, wherein the first end portion includes a first mesh portion and a first closed portion, wherein the second end includes a second end portion, wherein the second end portion includes a second mesh portion and a second closed portion, and wherein the second closed portion includes a third zippered opening extending substantially around an additional perimeter of the second closed portion.

19. An animal carrier comprising:
a top panel;
a bottom panel positioned substantially parallel to the top panel and including an exterior side and a plurality of feet positioned on the exterior side, wherein at least one of the plurality of feet includes an electrical conductor that is electrically connected to an interior side of the animal carrier;
a first end;
a second end positioned opposite the first end; and
a pair of side panels, each side panel attached to the top panel, the bottom panel, the first end, and the second end, wherein:
the bottom panel includes a semi-rigid base, the top panel, the bottom panel, and the side panels together define an interior cavity,
the animal carrier further includes a first flap positioned at the first end, attached at a top of the first end, and releasably attached to a bottom of the first end,
the first end includes a first end portion and a zippered opening extending substantially around a perimeter of the first end portion, and
the second end includes a second end portion, wherein the second end portion includes a second mesh portion and a second closed portion.

20. The animal carrier of claim 19, further comprising:
a plurality of carry straps, wherein each carry strap includes a first strap end attached to a first side panel of the pair of side panels and a second strap end attached to a second side panel of the pair of side panels; and
one or more openings for air positioned on one or more of the top panel, the first side panel, or the second side panel, wherein one or more of the first side panel and the second side panel include an attachment configured to receive a cushioned insert.

* * * * *